United States Patent
Hu et al.

(10) Patent No.: US 9,215,663 B2
(45) Date of Patent: Dec. 15, 2015

(54) METHODS AND DEVICES FOR CONTROLLING UPLINK TRANSMIT POWER AT AN ACCESS TERMINAL

(71) Applicant: Qualcomm Incorporated, San Diego, CA (US)

(72) Inventors: Jun Hu, San Diego, CA (US); Rashid Ahmed Akbar Attar, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 171 days.

(21) Appl. No.: 13/763,031

(22) Filed: Feb. 8, 2013

(65) Prior Publication Data
US 2014/0003341 A1 Jan. 2, 2014

Related U.S. Application Data

(60) Provisional application No. 61/666,544, filed on Jun. 29, 2012.

(51) Int. Cl.
*H04W 4/00* (2009.01)
*H04W 52/14* (2009.01)
*H04W 52/36* (2009.01)
*H04W 52/34* (2009.01)

(52) U.S. Cl.
CPC ............ *H04W 52/146* (2013.01); *H04W 52/34* (2013.01); *H04W 52/367* (2013.01)

(58) Field of Classification Search
None
See application file for complete search history.

(56) References Cited

U.S. PATENT DOCUMENTS

| | | | |
|---|---|---|---|
| 6,594,501 B2 | 7/2003 | Black et al. | |
| 6,829,468 B2 | 12/2004 | Gandhi et al. | |
| 7,734,262 B2 | 6/2010 | Akbar Attar et al. | |
| 8,068,868 B2 | 11/2011 | Chen et al. | |
| 8,229,494 B1 | 7/2012 | Kela et al. | |
| 8,462,741 B2* | 6/2013 | Zhang et al. | 370/336 |
| 8,700,086 B2* | 4/2014 | Han et al. | 455/522 |
| 8,705,397 B2* | 4/2014 | Ahn et al. | 370/252 |
| 2003/0032441 A1* | 2/2003 | Ofuji et al. | 455/525 |
| 2003/0058811 A1 | 3/2003 | Shurvinton | |

(Continued)

FOREIGN PATENT DOCUMENTS

| | | |
|---|---|---|
| TW | 514772 | 12/2002 |
| TW | 535378 | 6/2003 |

(Continued)

OTHER PUBLICATIONS

International Search Report—PCT/US2006/027968, International Search Authority—European Patent Office—Nov. 24, 2006.

(Continued)

*Primary Examiner* — Bob Phunkulh
(74) *Attorney, Agent, or Firm* — Larry Moskowitz (57) ABSTRACT

Apparatus and methods are provided to enable a ratcheting of uplink transmit power at an access terminal in a wireless communication network, such that the transmit power is maintained between an upper threshold and a lower threshold. Here, the decision whether to ratchet the power may be based on one or both of the open-loop transmit power and/or the closed-loop transmit power. Moreover, the decision whether to ratchet the transmit power may be based on the power per carrier in a multi-carrier wireless communication network. Other aspects, embodiments, and features are also claimed and described.

32 Claims, 7 Drawing Sheets

(56) References Cited

U.S. PATENT DOCUMENTS

| | | | |
|---|---|---|---|
| 2004/0242256 A1* | 12/2004 | Xiao et al. | 455/522 |
| 2004/0252658 A1 | 12/2004 | Hosein et al. | |
| 2005/0059421 A1 | 3/2005 | Reed et al. | |
| 2005/0147022 A1 | 7/2005 | Hosur et al. | |
| 2010/0016010 A1* | 1/2010 | Kashiwase et al. | 455/522 |
| 2010/0202392 A1* | 8/2010 | Zhang et al. | 370/329 |
| 2010/0273520 A1 | 10/2010 | Pelletier et al. | |
| 2010/0285830 A1 | 11/2010 | Englund et al. | |
| 2010/0291963 A1* | 11/2010 | Patel et al. | 455/522 |
| 2010/0323642 A1* | 12/2010 | Morita | 455/115.3 |
| 2011/0044296 A1* | 2/2011 | Zhang et al. | 370/336 |
| 2011/0081936 A1* | 4/2011 | Haim et al. | 455/522 |
| 2011/0159914 A1 | 6/2011 | Chen et al. | |
| 2011/0287804 A1 | 11/2011 | Seo et al. | |
| 2011/0292826 A1* | 12/2011 | Ahn et al. | 370/252 |
| 2011/0292899 A1* | 12/2011 | Yu et al. | 370/329 |
| 2011/0310781 A1 | 12/2011 | Kim et al. | |
| 2012/0163228 A1* | 6/2012 | Sung et al. | 370/252 |

FOREIGN PATENT DOCUMENTS

| | | |
|---|---|---|
| TW | 200503456 | 1/2005 |
| WO | 0124568 | 4/2001 |
| WO | 0158046 | 8/2001 |

OTHER PUBLICATIONS

International Preliminary Report on Patentability—PCT/US2006/027968, International Bureau of WIPO—Geneva, Switzerland—Jan. 22, 2008.

"3rd Generation Partnership Project; Technical Specification Group Radio Access Network; Evolved Universal Terrestrial Radio Access (E-UTRA); User Equipment (UE) radio transmission and reception; (Release 10)", 3GPP Standard; 3GPP TR 36.807, 3rd Generation Partnership Project (3GPP), Mobile Competence Centre; 650, Route Des Lucioles; F-06921 Sophia-Antipolis Cedex; France, vol. RAN WG4, No. V2.0.0, Jun. 15, 2012, pp. 1-186, XP050580683, [retrieved on Jun. 15, 2012].

International Search Report and Written Opinion—PCT/US2013/047076—ISA/EPO—Aug. 21, 2013.

* cited by examiner

METHODS AND DEVICES FOR CONTROLLING UPLINK TRANSMIT POWER AT AN ACCESS TERMINAL

PRIORITY CLAIM

The present Application for Patent claims priority to Provisional Application No. 61/666,544 entitled "Methods and Devices for Controlling Uplink Power At An Access Terminal," filed Jun. 29, 2012 and assigned to the assignee hereof, hereby expressly incorporated by reference herein as if fully set forth below and for all applicable purposes.

TECHNICAL FIELD

The technology discussed in this patent application relates generally to wireless communication, and more specifically, to controlling transmit power at an access terminal. Controlling transmit power can enable efficient use of limited power resources in an effort to conserve energy use.

BACKGROUND

Wireless communications systems are widely deployed to provide various types of communication content such as voice, video, packet data, messaging, broadcast, and so on. These systems may be accessed by various types of access terminals adapted to facilitate wireless communications, where multiple access terminals share the available system resources (e.g., time, frequency, and power). Examples of such wireless communications systems include code-division multiple access (CDMA) systems, time-division multiple access (TDMA) systems, frequency-division multiple access (FDMA) systems and orthogonal frequency-division multiple access (OFDMA) systems.

As the demand for mobile broadband access continues to increase, research and development continue to advance the wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Various features and aspects of the present disclosure are adapted to provide a ratcheting of uplink transmit power at an access terminal in a wireless communication network, such that the transmit power is maintained between an upper threshold and a lower threshold. Here, the decision whether to ratchet the power may be based on one or both of the open-loop transmit power and/or the closed-loop transmit power. Moreover, the decision whether to ratchet the transmit power may be based on the power per carrier in a multi-carrier wireless communication network.

In one aspect, the disclosure provides an access terminal that includes communications interface configured for communicating with an access network over a plurality of carriers, a storage medium and a processing circuit coupled to the communications interface and the storage medium. The processing circuit is configured to receive an instruction to reduce a transmit power and if a selected power is less than or equal to a lower threshold, to ratchet to hold a portion of the transmit power corresponding to a carrier in the plurality of carriers.

In another aspect, the disclosure provides an access terminal that includes a communications interface configured for communicating with an access network over a plurality of carriers, a storage medium and a processing circuit coupled to the communications interface and the storage medium. The processing circuit is configured to receive an instruction to increase a transmit power and if a selected power is greater than or equal to an upper threshold, to ratchet to hold a portion of the transmit power corresponding to a carrier in the plurality of carriers.

In yet another aspect, the disclosure provides an access terminal that includes means for communicating with an access network over a plurality of carriers, means for receiving an instruction to reduce a transmit power and if a selected power is less than or equal to a lower threshold, means for ratcheting to hold a portion of the transmit power corresponding to a carrier in the plurality of carriers.

In yet another aspect, the disclosure provides an access terminal that includes means for communicating with an access network over a plurality of carriers, means for receiving an instruction to increase a transmit power and if a selected power is greater than or equal to a upper threshold, means for ratcheting to hold a portion of the transmit power corresponding to a carrier in the plurality of carriers.

In yet another aspect, the disclosure provides a method of controlling an uplink transmit power operable at an access terminal that includes communicating with an access network over a plurality of carriers, receiving an instruction to reduce a transmit power, and if a selected power is less than or equal to a lower threshold, ratcheting to hold a portion of the transmit power corresponding to a carrier in the plurality of carriers.

In yet another aspect, the disclosure provides a method of controlling an uplink transmit power operable at an access terminal that includes communicating with an access network over a plurality of carriers, receiving an instruction to increase a transmit power, and if a selected power is greater than or equal to an upper threshold, ratcheting to hold a portion of the transmit power corresponding to a carrier in the plurality of carriers.

In yet another aspect, the disclosure provides a computer readable storage medium containing a program which, when executed by a processing circuit, performs an operation. The operation includes a method of controlling an uplink transmit power operable at an access terminal. The method includes communicating with an access network over a plurality of carriers, receiving an instruction to reduce a transmit power and if a selected power is less than or equal to a lower threshold, ratcheting to hold a portion of the transmit power corresponding to a carrier in the plurality of carriers.

In yet another embodiment, the disclosure provides a computer readable storage medium containing a program which, when executed by a processor, performs an operation. The operation includes a method of controlling an uplink transmit power operable at an access terminal. The method includes communicating with an access network over a plurality of carriers, receiving an instruction to increase a transmit power and if a selected power is greater than or equal to an upper threshold, ratcheting to hold a portion of the transmit power corresponding to a carrier in the plurality of carriers.

By accordingly ratcheting the uplink transmit power when the access terminal's transmit power reaches the upper threshold or the lower threshold, the causing of unnecessary interference to the network, or the dropping of the call may be reduced.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

The various concepts presented throughout this disclosure may be implemented across a broad variety of wireless communication systems, network architectures, and communication standards. Certain aspects of the discussions are described below for CDMA and 3rd Generation Partnership Project 2 (3GPP2) 1× protocols and systems, and related terminology may be found in much of the following description. However, those of ordinary skill in the art will recognize that one or more aspects of the present disclosure may be employed and included in one or more other wireless communication protocols and systems, including but not limited to those described by 3GPP GSM, UMTS, and LTE standards.

Figure 1:
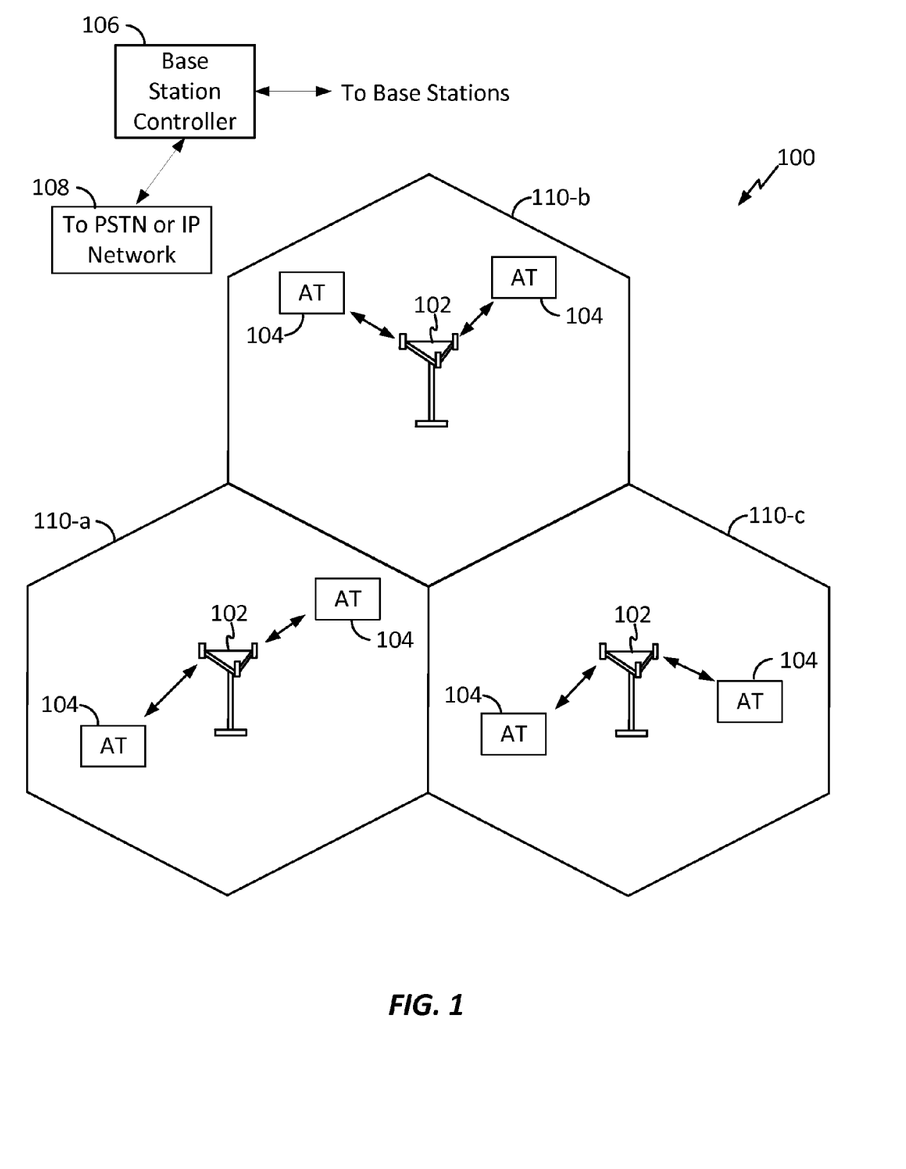
FIG. 1 is a block diagram illustrating an example of a network environment in which one or more aspects of the present disclosure may find application.

FIG. 1 is a block diagram illustrating an example of a network environment in which one or more aspects of the present disclosure may find application. The wireless communication system 100 generally includes one or more base stations 102, one or more access terminals 104, one or more base station controllers (BSC) 106, and a core network 108 providing access to a public switched telephone network (PSTN) (e.g., via a mobile switching center/visitor location register (MSC/VLR)) and/or to an IP network (e.g., via a packet data switching node (PDSN)). The system 100 may support operation on multiple carriers (waveform signals of different frequencies). Multi-carrier transmitters can transmit modulated signals simultaneously on the multiple carriers. Each modulated signal may be a CDMA signal, a TDMA signal, an OFDMA signal, a Single Carrier Frequency Division Multiple Access (SC-FDMA) signal, etc. Each modulated signal may be sent on a different carrier and may carry control information (e.g., pilot signals), overhead information, data, etc.

The base stations 102 can wirelessly communicate with the access terminals 104 via a base station antenna. The base stations 102 may each be implemented generally as a device adapted to facilitate wireless connectivity (for one or more access terminals 104) to the wireless communications system 100. A base station 102 may also be referred to by those skilled in the art as an access point, a base transceiver station (BTS), a radio base station, a radio transceiver, a transceiver function, a basic service set (BSS), an extended service set (ESS), a Node B, a femto cell, a pico cell, and/or some other suitable terminology.

The base stations 102 are configured to communicate with the access terminals 104 under the control of the base station controller 106 via one or more carriers. Each of the base stations 102 can provide communication coverage for a respective geographic area. The coverage area 110 for each base station 102 here is identified as cells 110-a, 110-b, or 110-c. The coverage area 110 for a base station 102 may be divided into sectors (not shown, but making up only a portion of the coverage area). In a coverage area 110 that is divided into sectors, the multiple sectors within a coverage area 110 can be formed by groups of antennas with each antenna responsible for communication with one or more access terminals 104 in a portion of the cell.

One or more access terminals 104 may be dispersed throughout the coverage areas 110, and may wirelessly communicate with one or more sectors associated with each respective base station 102. An access terminal 104 may generally include one or more devices that communicate with one or more other devices through wireless signals. Such access terminals 104 may also be referred to by those skilled in the art as a user equipment (UE), a mobile station (MS), a subscriber station, a mobile unit, a subscriber unit, a wireless unit, a remote unit, a mobile device, a wireless device, a wireless communications device, a remote device, a mobile subscriber station, a mobile terminal, a wireless terminal, a remote terminal, a handset, a terminal, a user agent, a mobile client, a client, or some other suitable terminology. The access terminals 104 may include mobile terminals and/or at least substantially fixed terminals. Examples of access terminals 104 include mobile phones, pagers, wireless modems, personal digital assistants, personal information managers (PIMs), personal media players, palmtop computers, laptop computers, tablet computers, televisions, appliances, e-readers, digital video recorders (DVRs), machine-to-machine (M2M) devices, and/or other communication/computing devices which communicate, at least partially, through a wireless or cellular network.

Figure 2:
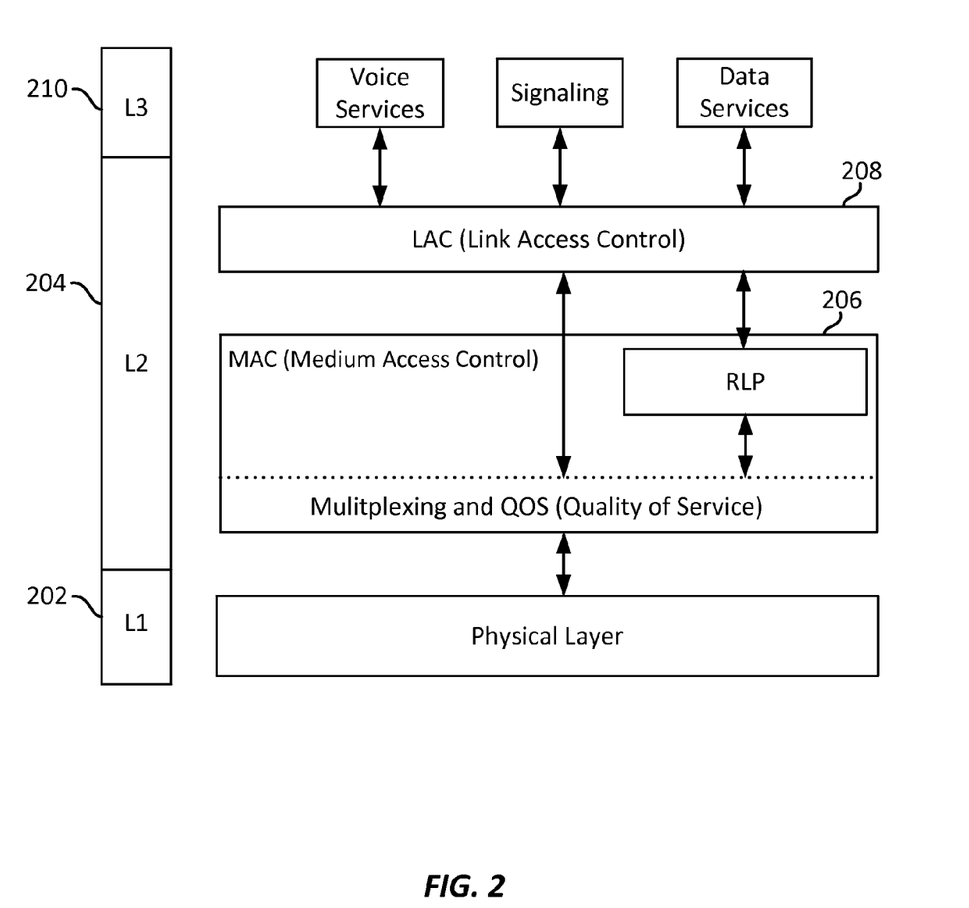
FIG. 2 is a block diagram illustrating an example of a protocol stack architecture which may be implemented by an access terminal according to some embodiments.

The access terminal 104 may be adapted to employ a protocol stack architecture for communicating data between the access terminal 104 and one or more network nodes of the wireless communication system 100 (e.g., the base station 102). A protocol stack generally includes a conceptual model of the layered architecture for communication protocols in which layers are represented in order of their numeric designation, where transferred data is processed sequentially by each layer, in the order of their representation. Graphically, the "stack" is typically shown vertically, with the layer having the lowest numeric designation at the base. FIG. 2 is a block diagram illustrating an example of a protocol stack architecture which may be implemented by an access terminal 104. Referring to FIGS. 1 and 2, the protocol stack architecture for the access terminal 104 is shown to generally include three layers: Layer 1 (L1), Layer 2 (L2), and Layer 3 (L3).

Layer 1 202 is the lowest layer and implements various physical layer signal processing functions. Layer 1 202 is also referred to herein as the physical layer 202. This physical layer 202 provides for the transmission and reception of radio signals between the access terminal 104 and a base station 102.

The data link layer, called layer 2 (or "the L2 layer") 204 is above the physical layer 202 and is responsible for delivery of signaling messages generated by Layer 3. The L2 layer 204 makes use of the services provided by the physical layer 202. The L2 layer 204 may include two sublayers: the Medium Access Control (MAC) sublayer 206, and the Link Access Control (LAC) sublayer 208.

The MAC sublayer 206 is the lower sublayer of the L2 layer 204. The MAC sublayer 206 implements the medium access protocol and is responsible for transport of higher layers' protocol data units using the services provided by the physical layer 202. The MAC sublayer 206 may manage the access of data from the higher layers to the shared air interface.

The LAC sublayer 208 is the upper sublayer of the L2 layer 204. The LAC sublayer 208 implements a data link protocol that provides for the correct transport and delivery of signaling messages generated at the layer 3. The LAC sublayer makes use of the services provided by the lower layers (e.g., layer 1 and the MAC sublayer).

Layer 3 210, which may also be referred to as the upper layer or the L3 layer, originates and terminates signaling messages according to the semantics and timing of the communication protocol between a base station 102 and the access terminal 104. The L3 layer 210 makes use of the services provided by the L2 layer. Information (both data and voice) message are also passed through the L3 layer 210.

As an access terminal 104 operates within the system 100, the access terminal 104 may employ various modes of operation, including a dedicated mode and an idle mode. In dedicated mode, the access terminal 104 may actively exchange data (e.g., voice or data calls or sessions) with one or more base stations (e.g., base stations 102 in FIG. 1). In idle mode, the access terminal 104 may monitor control channels, such as a paging channel (PCH) for paging messages. Such paging messages may include messages that alert the access terminal 104 to the occurrence of an incoming voice or data call and control/overhead messages that carry system information and other information for the access terminal 104.

Figure 3:
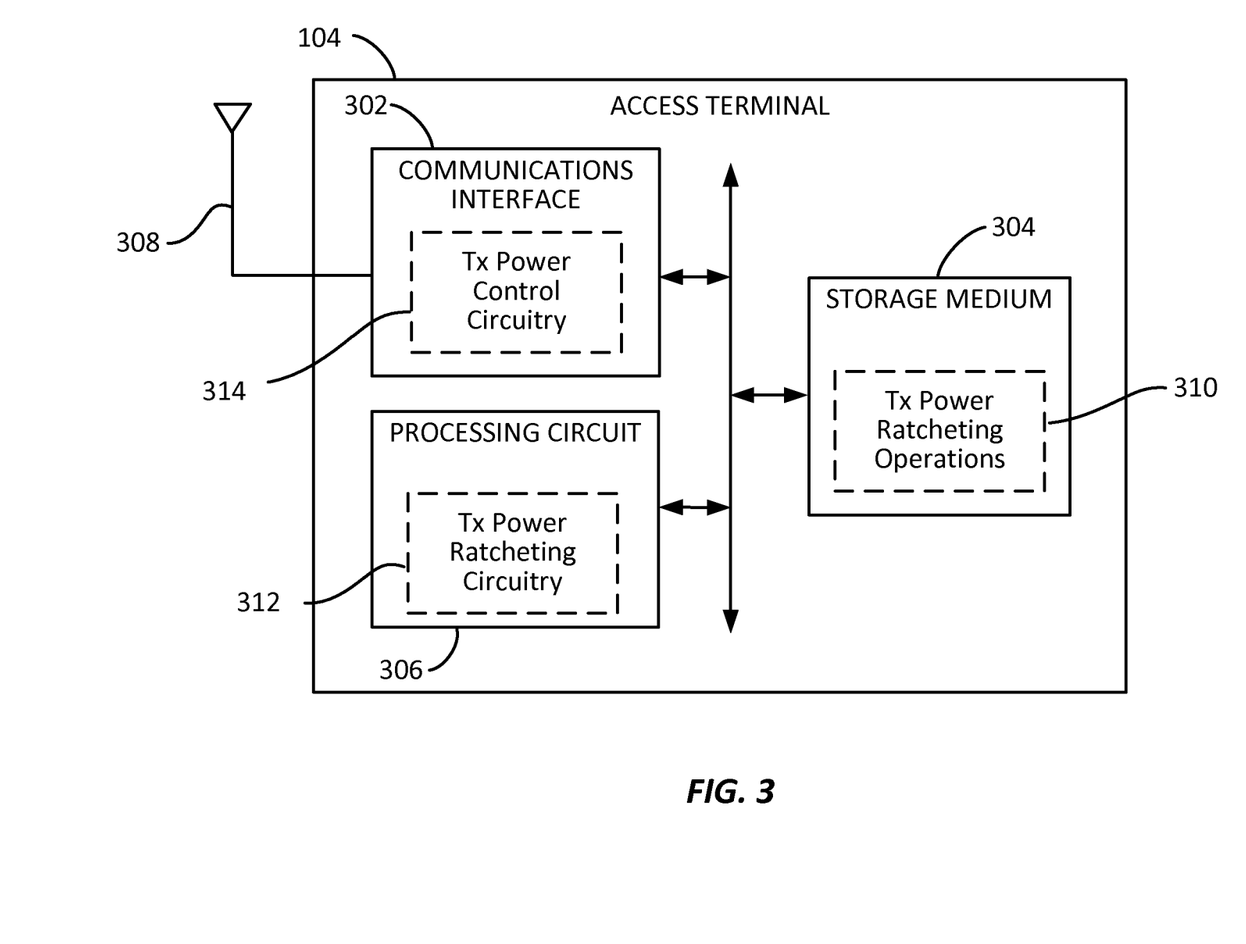
FIG. 3 is a block diagram illustrating select components of an access terminal according to some embodiments.

FIG. 3 shows a block diagram illustrating select components of an access terminal 104 according to at least one example of the present disclosure. The access terminal 104 includes a communications interface 302 and a storage medium 304. These components can be coupled to and/or placed in electrical communications with a processing circuit 306.

The communications interface 302 may be adapted to facilitate wireless communications of the access terminal 104. For example, the communications interface 302 may include circuitry and/or programming adapted to facilitate the communication of information bi-directionally with respect to one or more communications devices in a network. The communications interface 302 may be coupled to one or more antennas 308 for wireless communications within a wireless communications system. The communications interface 302 can be configured with one or more standalone receivers and/or transmitters, as well as one or more transceivers.

The storage medium 304 may represent one or more computer-readable, machine-readable, and/or processor-readable devices for storing programming, such as processor executable code or instructions (e.g., software, firmware), electronic data, databases, or other digital information. The storage medium 304 may also be used for storing data that is manipulated by the processing circuit 306 when executing programming The storage medium 304 may be any available media that can be accessed by a general purpose or special purpose processor, including portable or fixed storage devices, optical storage devices, and various other mediums capable of storing, containing or carrying programming By way of example and not limitation, the storage medium 304 may include a computer-readable, machine-readable, and/or processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof.

The storage medium 304 may be coupled to the processing circuit 306 such that the processing circuit 306 can read information from, and write information to, the storage medium 304. That is, the storage medium 304 can be coupled to the processing circuit 306 so that the storage medium 304 is at least accessible by the processing circuit 306, including examples where at least one storage medium is integral to the processing circuit 306 and/or examples where at least one storage medium is separate from the processing circuit 306 (e.g., resident in the access terminal 104, external to the access terminal 104, distributed across multiple entities).

Programming stored by the storage medium 304, when executed by the processing circuit 306, causes the processing circuit 306 to perform one or more of the various functions and/or process steps described herein. For example, the storage medium 304 may include transmit power ratcheting operations 310 adapted for regulating operations at one or more hardware blocks of the processing circuit 306 such as transmit power ratcheting circuitry 312, as described in further detail below. In another example, the transmit power ratcheting circuitry 312 may be embodied in the communication interface 302. In at least one example, the communication interface 302 may include transmit power control circuitry 314 to control the transmit power based on instructions or control signals provided by the processing circuit 306.

The processing circuit 306 is generally adapted for processing, including the execution of such programming stored on the storage medium 304. As used herein, the term "programming" shall be construed broadly to include without limitation instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 306 is arranged to obtain, process and/or send data, control data access and storage, issue commands, and control other desired operations. The processing circuit 306 may include circuitry configured to implement desired programming provided by appropriate media in at least one example. For example, the processing circuit 306 may be implemented as one or more processors, one or more controllers, and/or other structure configured to execute executable programming. Examples of the processing circuit 306 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 306 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 306 are for illustration and other suitable configurations within the scope of the present disclosure are also contemplated.

According to one or more aspects of the present disclosure, the processing circuit 306 may be adapted to perform any or all of the features, processes, functions, steps and/or routines for any or all of the access terminals 104 described herein. As used herein, the term "adapted" in relation to the processing circuit 306 may refer to the processing circuit 306 being one or more of configured, employed, implemented, and/or programmed to perform a particular process, function, step and/or routine according to various features described herein.

Figure 4:
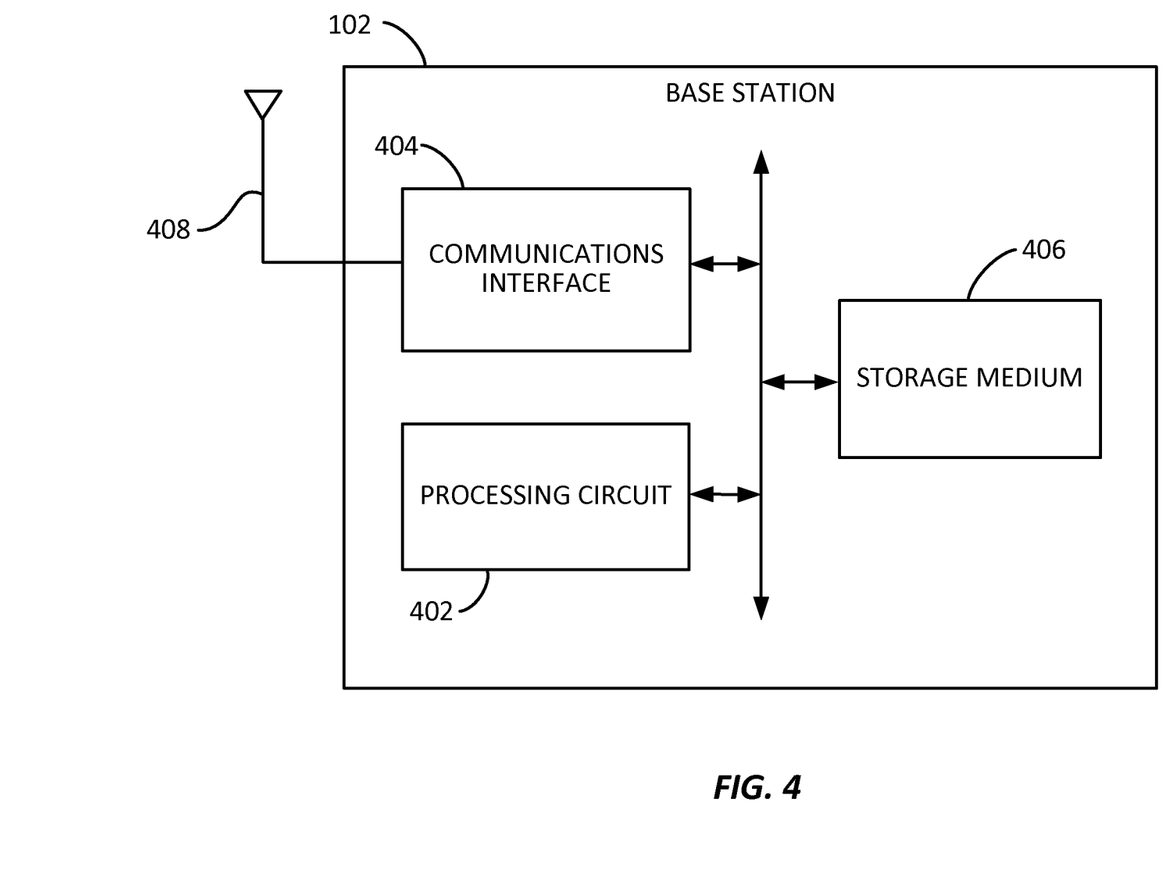
FIG. 4 is a block diagram illustrating select components of a base station according to some embodiments.

According to various further aspects of the present disclosure, base stations are provided, which are adapted to transmit power control information to one or more access terminals 104. Turning to FIG. 4, a block diagram is shown illustrating select components of a base station 102 according to at least one implementation. The base station 102 may include a processing circuit 402 coupled to a communications interface 404 and to a storage medium 406.

The processing circuit 402 is arranged to obtain, process and/or send data, control data access and storage, issue commands, and control other desired operations. The processing circuit 402 may include circuitry configured to implement desired programming provided by appropriate media in at least one example, and may be implemented and/or adapted in a manner similar to the processing circuit 306 described above.

The communications interface 404 is configured to facilitate wireless communications of the base station 102. For example, the communications interface 404 may include circuitry and/or programming adapted to facilitate the communication of information with respect to one or more access terminals 102. The communications interface 404 may be coupled to one or more antennas (not shown), and includes wireless transceiver circuitry.

The storage medium 406 may represent one or more devices for storing programming and/or data, such as processor executable code or instructions (e.g., software, firmware), electronic data, databases, or other digital information. The storage medium 406 may be configured and/or implemented in a manner similar to the storage medium 304 described above.

Like the storage medium 304, the storage medium 406 includes programming stored thereon. The programming stored by the storage medium 406, when executed by the processing circuit 402, causes the processing circuit 402 to perform one or more of the various functions and/or process steps described herein. Thus, according to one or more aspects of the present disclosure, the processing circuit 402 may be adapted to perform (in conjunction with the storage medium 406) any or all of the processes, functions, steps and/or routines for any or all of the network nodes described herein (e.g., base station 102 and/or base station controller 106 in FIG. 1). As used herein, the term "adapted" in relation to the processing circuit 402 may refer to the processing circuit 402 being one or more of configured, employed, implemented, and/or programmed to perform a particular process, function, step and/or routine according to various features described herein.

As described above, in some aspects of the present disclosure, the base station 102 and the access terminal 104 may be configured for operation in a CDMA 1× EV-DO network. In this network, such a base station 102 is generally capable of transmitting power control commands to access terminals 102 in its proximity, for the purpose of controlling the transmit power of the access terminals 102 on the reverse link. For example, the base station 102 may transmit on the forward link various control information, including an information element for reverse link power control (RPC). This information element may include, for example, an UP command, or a DOWN command corresponding to the respective changes in the reverse link power. By utilizing these power control commands, an access terminal with a high transmit power, which may cause substantial interference to neighboring base stations, can be requested to reduce its transmit power by those neighboring base stations, or by its serving base station. Furthermore, an access terminal with a low transmit power may be requested by its neighboring base stations to increase its transmit power, for example, when the access terminal moves a large distance from the base station, and/or to overcome interference as needed.

The transmit power for reverse link transmissions by the access terminal 104 includes several components, with the total power being designated herein as txTotalPwr_all. In an example where reverse link transmissions may occupy more than one carrier, the total reverse link transmission power txTotalPwr_all represents a sum of the total transmit power among each of the plurality of carriers, where each carrier may be identified by a carrier index c. Thus, each carrier's total transmit power is designated herein as txTotalPwr[c]. That is, txTotalPwr_all is the sum of txTotalPwr[c] for all values of c:

$$\text{txTotalPwr\_all} = \sum_c \text{txTotalPwr}[c] \qquad \text{Equation (1)}$$

Furthermore, each carrier c may include a plurality of components, including a pilot power (txPilotPwr[c]), as well as signaling and/or data powers. Typically the pilot power txPilotPwr[c] is the sum of an open loop pilot power tx_openloop and a closed loop pilot power tx_closedloop. Here, in some examples, the open loop pilot power tx_openloop may be based on a filtered value of an automatic gain control (AGC) corresponding to a received signal, designated as RxAGC0; and the closed loop power tx_closedloop may be based on the received RPC command transmitted by the base station 102.

Figure 5:
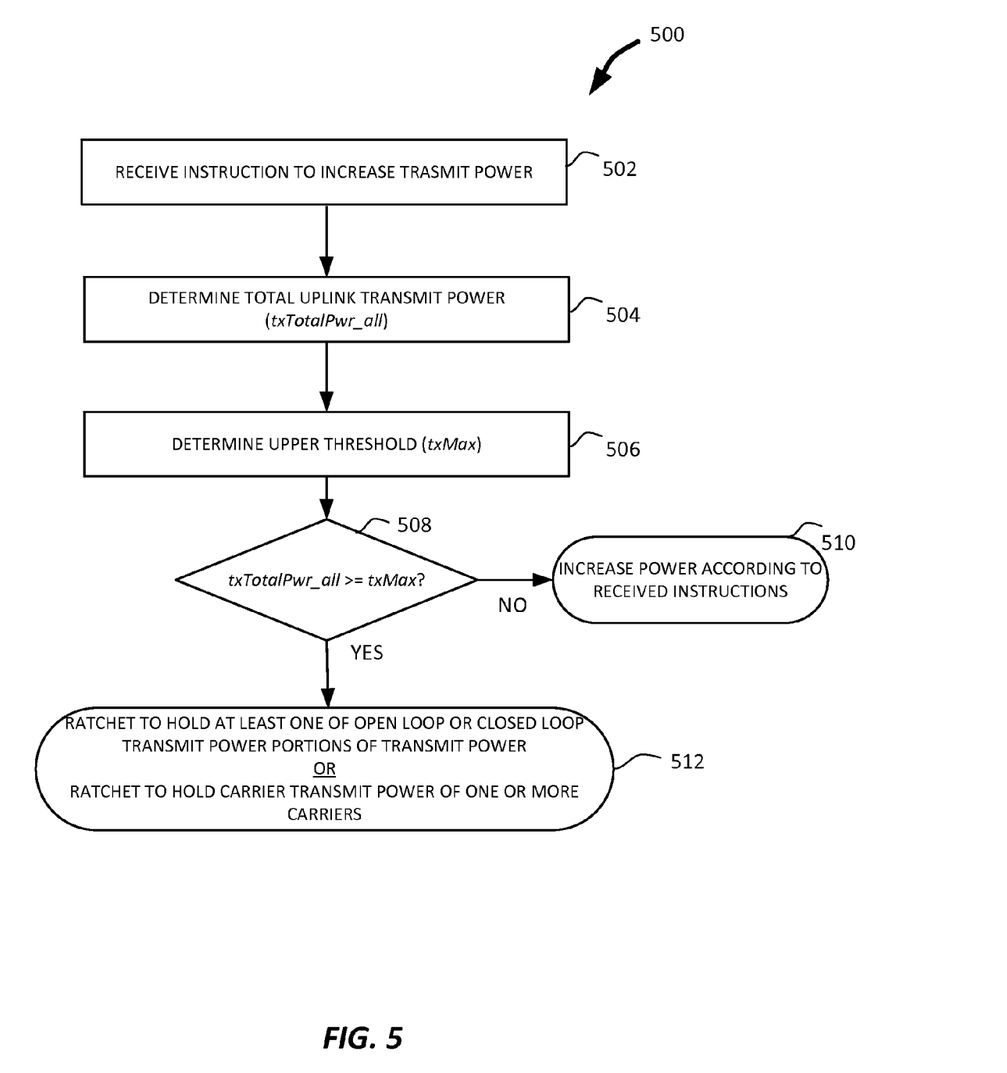
FIG. 5 is a flow chart illustrating a process of increasing a transmit power at an access terminal according to some embodiments.

Moving now to FIG. 5, a flow chart illustrates a process 500 for increasing the uplink or reverse link transmit power at the access terminal 104 in accordance with some aspects of the disclosure. Accordingly, at step 502, the access terminal 104 may receive an instruction from a base station 102 to increase its transmit power. At step 504, the processing circuit 306 may determine the current total uplink transmit power corresponding to all carriers, e.g., according to Equation (1) above. At step 506, the processing circuit 306 may determine the upper threshold txMax of the uplink transmit power. In one example, this upper threshold txMax may be provided by an RF system, which may be a part of the communication interface 302 within the access terminal 104, and may be controlled by the processing circuit 306. In another example, the upper threshold txMax may be provided by the network. In various examples, this upper threshold txMax may correspond to a single carrier c (e.g., wherein a plurality of thresholds may correspond to the plurality of carriers), while in other examples, this upper threshold txMax may correspond to the total transmit power txTotalPwr_all, corresponding to all carriers. In any case, to utilize the upper threshold, in some aspects of the disclosure, when the corresponding transmit power for the access terminal reaches the upper threshold txMax, further adjustment of the transmit power may be modified according to a set of rules described herein.

At decision step 508, in one example, a determination is made if the total transmit power txTotalPwr_all is greater than or equal to the variable txMax. Here, it may be possible that the instruction received by the access terminal 104 at step 502 is an RPC command for any carrier including an UP command. At step 512, the access terminal 104 may be configured to ratchet to hold the transmit power for that carrier. That is, if txTotalPwr_all≥txMax, then a received RPC UP command for a carrier c may be interpreted as a HOLD command for that carrier c, such that the closed loop transmit power tx_closedloop for that carrier may be maintained rather than increased.

In a further example, at step 512, if txTotalPwr_all≥txMax, and if the open loop transmit power tx_openloop for any carrier is requested to be increased to a higher value, the access terminal 104 may ratchet to hold this value, such that the open loop transmit power tx_openloop is maintained rather than increased. Thus, in various aspects of the disclosure, one or both of the open loop transmit power and/or the closed loop transmit power may utilize ratcheting and may be maintained rather than increased in response to an increase command when txTotalPwr_all≥txMax. However, if the condition txTotalPwr_all≥txMax is not met at step 508, the power may be increased according to the instruction.

In another example, the ratcheting process described above may also be performed on the basis of a plurality of carriers, up to and including the total transmit power txTotalPwr_all. That is, instead of maintaining one or both of the open loop transmit power and/or the closed loop transmit power of a single carrier c in spite of an increase command, one or both of the open loop transmit power and/or the closed loop transmit power of any number of carriers may be ratcheted to hold when txTotalPwr_all≥txMax.

Figure 6:
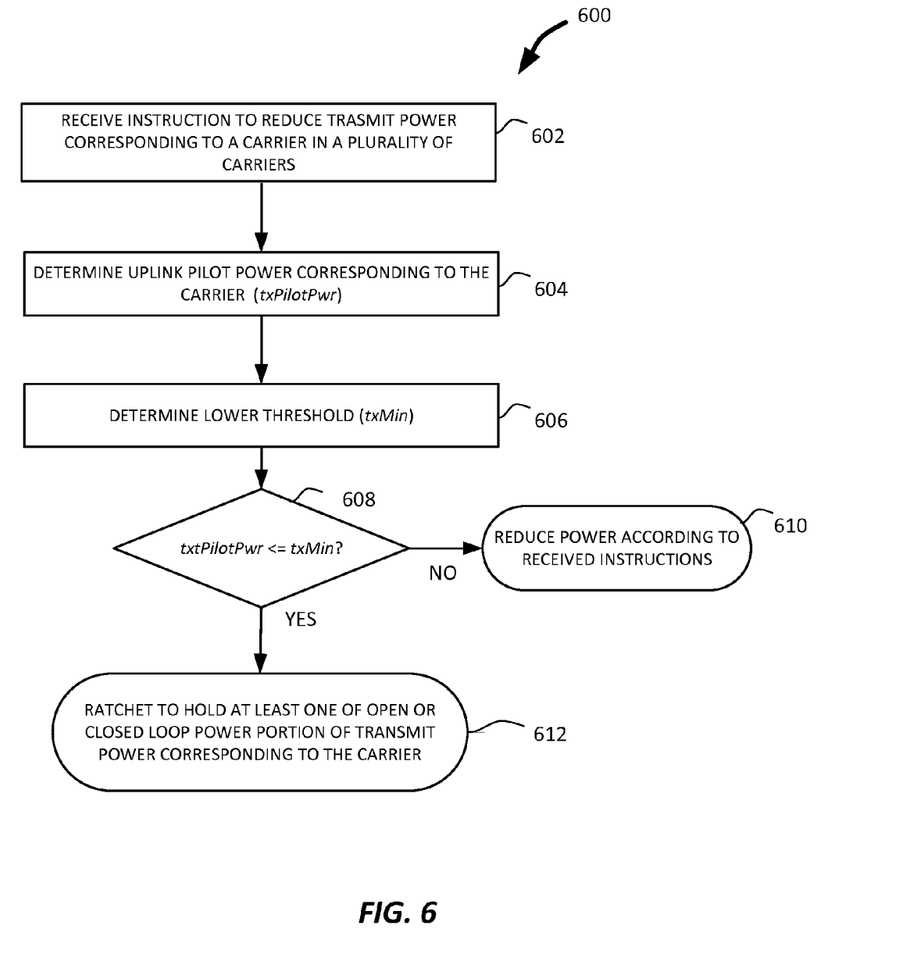
FIG. 6 is a flow chart illustrating a process of reducing a transmit power at an access terminal according to some embodiments.

Moving now to FIG. 6, a flowchart illustrates a process 600 for reducing transmit power corresponding to a carrier in a plurality of carriers in accordance with some aspects of the disclosure. In one example, the access terminal 104 may receive an instruction from the base station 102 to reduce its transmit power (e.g., an RPC command of carrier c including a DOWN command). According to one or more aspects of the present disclosure, when the access terminal 104 receives power control commands, the response to those commands may follow a kind of ratcheting, wherein, if the transmit power (e.g., one or more parts of the transmission power) has reached either an upper threshold or a lower threshold, the adjustment to the transmit power may be based on certain criteria in addition to or other than the power control commands.

Accordingly, at step 602, an instruction to reduce transmit power may be received from the base station 102. As described above, for each of the plurality of carriers, the value of txTotalPwr[c] includes as a component part a pilot power, designated herein as txPilotPwr[c]. Note that the total transmit power for each carrier txTotalPower[c] is generally greater than txPilotPwr[c], when the access terminal 104 is transmitting signaling and/or data in addition to the pilot.

Going further, as described above, the pilot power for a particular carrier txPilotPwr[c] is the sum of an open loop power tx_openloop and a closed loop power tx_closedloop. Here, the open loop power tx_openloop may be based on a filtered value of an automatic gain control (AGC) corresponding to a received signal, designated as RxAGC0; and the closed loop power tx_closedloop may be based on the received RPC command transmitted by the base station 102.

Accordingly, at step 604, the processing circuit 306 may determine the uplink pilot power corresponding to the carrier c. Further at step 606, a lower threshold may be determined. For example, a lower threshold on the transmission power may be designated txMin. In some examples, the value of the lower threshold txMin may be limited by the dynamic range of firmware (FW) variables. This lower bound may apply to one or both of the pilot power txPilotPwr[c] and/or the carrier transmit power txTotalPwr[c].

To utilize the lower threshold, in some aspects of the disclosure, when the transmit power for the access terminal for any carrier reaches the lower threshold, further adjustment of the transmit power for that carrier may be modified according to a set of rules described herein.

At decision step 608, a determination may be made if the pilot power for a carrier c has reached the lower threshold, i.e., if txPilotPwr[c]≤txMin. At step 612, in an aspect of the present disclosure, the access terminal 104 may be configured to ratchet any further power change requests that request reductions in the transmit power further below the lower threshold. That is, if txPilotPwr[c]≤txMin, then a received RPC DOWN command may be interpreted as a HOLD command, such that the closed loop transmit power for carrier c may be maintained rather than reduced.

In a further example, if txPilotPwr[c]≤txMin, and if the open loop transmit power for carrier c is requested to be reduced to a lower value, the access terminal 104 may ratchet to hold this value, such that the open loop transmit power is maintained rather than reduced. Thus, in various aspects of the disclosure, one or both of the open loop transmit power and/or the closed loop transmit power may utilize ratcheting and may be maintained rather than reduced in response to a reduce command when txPilotPwr[c]≤txMin.

However, at decision step 608, if the condition txPilotPwr[c]≤txMin is not met, at step 610, the transmit power may be reduced according to the instruction.

Figure 7:
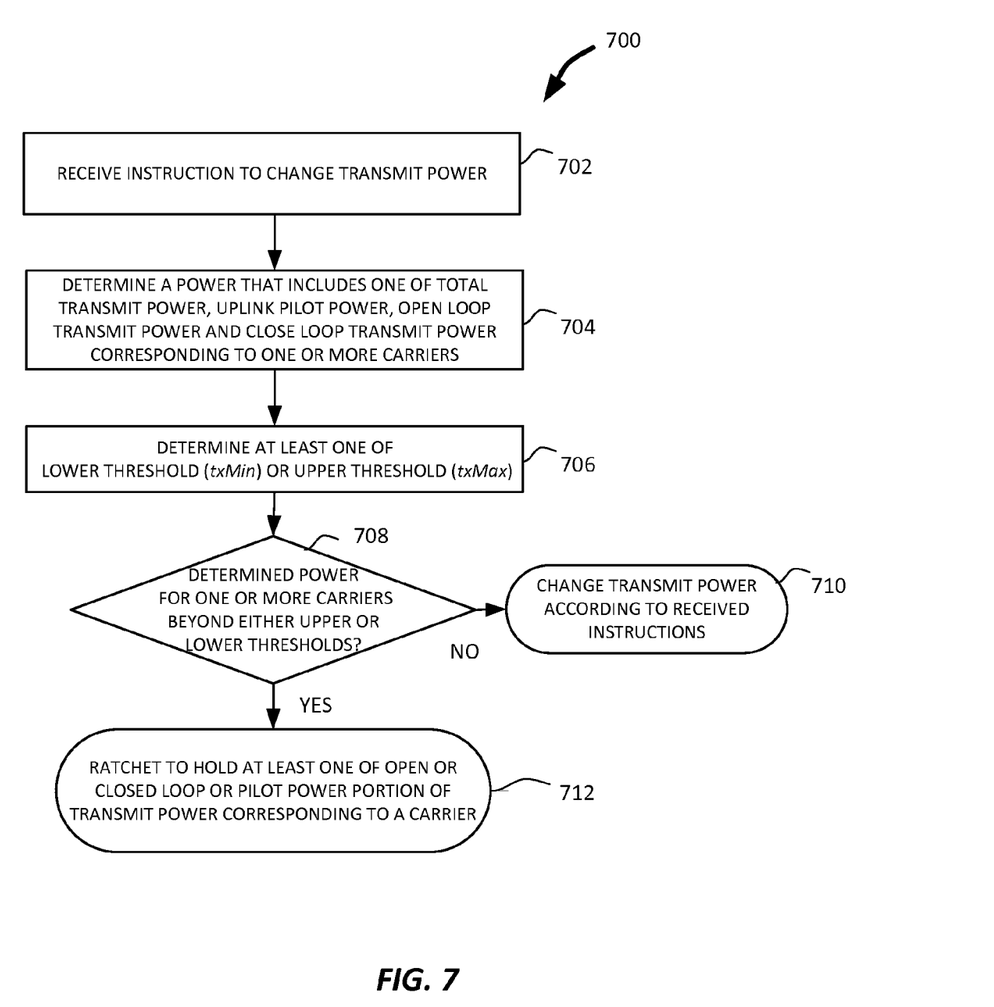
FIG. 7 is a flow chart illustrating a process of changing a transmit power at an access terminal according to some embodiments.

Turning now to FIG. 7, a flow chart is depicted, which illustrates a process 700 for changing transmit power corresponding to one or more carriers in a plurality of carriers in accordance with some aspects of the disclosure. Accordingly, at step 702, the access terminal 104 may receive an instruction either to reduce or increase its transmit power. In one example, the instruction may include changing transmit power for one or more selected carrier(s). In another example, the access terminal 104 may be instructed to change the overall transmit power. Based on the instruction, at step 704, the access terminal 104 may determine one or more of the total transmit power, uplink pilot power, open loop transmit power, or close loop transmit power corresponding to one or more carriers in the plurality of carriers. In one example, if the instruction includes changing overall transmit power, one or more of the following parameters may be calculated: a sum of uplink pilot powers for the plurality of carriers, a sum of open loop transmit powers for the plurality of carriers, a sum of closed loop transmit powers for the plurality of carriers, or a sum of total transmit powers for the plurality of carriers. Subsequently at step 706, the access terminal 104 may determine one of a lower threshold (txMin) or an upper threshold (txMax). Based on the instruction, the txMin or txMax may be determined either on a per carrier basis or overall for all carriers.

At decision step 708, a determination may be made as to whether the power determined at step 704 is beyond either txMax, if the instruction includes increasing the transmit power, or txMin, if the instruction includes reducing the transmit power. If not, at step 710, the power may be changed according to the instruction. However, if the answer is yes, at step 712, the access terminal 104 may ratchet to hold at least one of the open loop transmit power, the closed loop transmit power, or the uplink pilot power portions of the transmit power corresponding to a carrier in the plurality of carriers. In one example, if the instruction includes changing the overall transmit power, the access terminal 104 may repeat step 712 for more than one carrier in the plurality of carriers.

While the above discussed aspects, arrangements, and embodiments are discussed with specific details and particularity, one or more of the components, steps, features and/or functions illustrated in FIGS. 1, 2, 3, and/or 4 may be rearranged and/or combined into a single component, step, feature or function or embodied in several components, steps, or functions. Additional elements, components, steps, and/or functions may also be added or not utilized without departing from the invention. The apparatus, devices and/or components illustrated in FIGS. 1, 3 and/or 4 may be configured to perform or employ one or more of the methods, features, parameters, or steps described in FIG. 4. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function. The various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the embodiments disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

The various features associated with the examples described herein and shown in the accompanying drawings can be implemented in different examples and implementations without departing from the scope of the present disclosure. Therefore, although certain specific constructions and arrangements have been described and shown in the accompanying drawings, such embodiments are merely illustrative and not restrictive of the scope of the disclosure, since various other additions and modifications to, and deletions from, the described embodiments will be apparent to one of ordinary skill in the art. Thus, the scope of the disclosure is only determined by the literal language, and legal equivalents, of the claims which follow.

The invention claimed is:

1. An access terminal, comprising:
a communications interface configured for communicating with an access network over a plurality of carriers;
a storage medium;
a processing circuit coupled to the communications interface and the storage medium, the processing circuit configured to:
receive an instruction to reduce a transmit power; and
if a selected power is less than or equal to a lower threshold, ratchet to hold a portion of the transmit power corresponding to a carrier in the plurality of carriers by maintaining the portion of the transmit power corresponding to the carrier, wherein the portion of the transmit power comprises a closed loop transmit power for the carrier based on a received reverse link power control (RPC) command and an open loop transmit power for the carrier based on an automatic gain control (AGC) filtered value.

2. The access terminal of claim 1, wherein the selected power is one of a uplink pilot power for the carrier, a total transmit power for the carrier, the open loop transmit power for the carrier, the closed loop transmit power for the carrier, a sum of uplink pilot powers for the plurality of carriers, a sum of open loop transmit powers for the plurality of carriers, a sum of closed loop transmit powers for the plurality of carriers, or a sum of total transmit powers for the plurality of carriers.

3. The access terminal of claim 2, wherein the portion of the transmit power comprises an uplink pilot power.

4. The access terminal of claim 3, wherein the uplink pilot power for the carrier is a component of the total transmit power for the carrier.

5. An access terminal, comprising:
a communications interface configured for communicating with an access network over a plurality of carriers;
a storage medium;
a processing circuit coupled to the communications interface and the storage medium, the processing circuit configured to:
receive an instruction to increase a transmit power; and if a selected power is greater than or equal to an upper threshold, ratchet to hold a portion of the transmit power corresponding to a carrier in the plurality of carriers by maintaining the portion of the transmit power corresponding to the carrier, wherein the portion of the transmit power comprises a closed loop transmit power for the carrier based on a received reverse link power control (RPC) command and an open loop transmit power for the carrier based on an automatic gain control (AGC) filtered value.

6. The access terminal of claim 5, wherein the selected power is one of a uplink pilot power for the carrier, a total transmit power for the carrier, the open loop transmit power for the carrier, the closed loop transmit power for the carrier, a sum of uplink pilot powers for the plurality of carriers, a sum of open loop transmit powers for the plurality of carriers, a sum of closed loop transmit powers for the plurality of carriers, or a sum of total transmit powers for the plurality of carriers.

7. The access terminal of claim 5, wherein the portion of the transmit power comprises an uplink pilot power.

8. The access terminal of claim 6, wherein a total uplink power is a sum of a carrier total uplink power for each of the plurality of carriers.

9. An access terminal, comprising:
means for communicating with an access network over a plurality of carriers;
means for receiving receive an instruction to reduce a transmit power; and
if a selected power is less than or equal to a lower threshold, means for ratcheting to hold a portion of the transmit power corresponding to a carrier in the plurality of carriers, wherein the means for ratcheting to hold includes means for maintaining the portion of the transmit power corresponding to the carrier, and wherein the portion of the transmit power comprises a closed loop transmit power for the carrier based on a received reverse link power control (RPC) command and an open loop transmit power for the carrier based on an automatic gain control (AGC) filtered value.

10. The access terminal of claim 9, wherein the selected power is one of a uplink pilot power for the carrier, a total transmit power for the carrier, the open loop transmit power for the carrier, the closed loop transmit power for the carrier, a sum of uplink pilot powers for the plurality of carriers, a sum of open loop transmit powers for the plurality of carriers, a sum of closed loop transmit powers for the plurality of carriers, or a sum of total transmit powers for the plurality of carriers.

11. The access terminal of claim 10, wherein the portion of the transmit power comprises an uplink pilot power.

12. The access terminal of claim 11, wherein the uplink pilot power for the carrier is a component of the total transmit power for the carrier.

13. An access terminal, comprising:
means for communicating with an access network over a plurality of carriers;
means for receiving an instruction to increase a transmit power; and
if a selected power is greater than or equal to an upper threshold, means for ratcheting to hold a portion of the transmit power corresponding to a carrier in the plurality of carriers, wherein the means for ratcheting to hold includes means for maintaining the portion of the transmit power corresponding to the carrier, and wherein the portion of the transmit power comprises a closed loop transmit power for the carrier based on a received reverse link power control (RPC) command and an open loop transmit power for the carrier based on an automatic gain control (AGC) filtered value.

14. The access terminal of claim 13, wherein the selected power is one of a uplink pilot power for the carrier, a total transmit power for the carrier, the open loop transmit power for the carrier, the closed loop transmit power for the carrier, a sum of uplink pilot powers for the plurality of carriers, a sum of open loop transmit powers for the plurality of carriers, a sum of closed loop transmit powers for the plurality of carriers, or a sum of total transmit powers for the plurality of carriers.

15. The access terminal of claim 13, wherein the portion of the transmit power comprises an uplink pilot power.

16. The access terminal of claim 14, wherein a total uplink power is a sum of a carrier total uplink power for each of the plurality of carriers.

17. A method of controlling an uplink transmit power operable at an access terminal, comprising:
communicating with an access network over a plurality of carriers;
receiving an instruction to reduce a transmit power; and
if a selected power is less than or equal to a lower threshold, ratcheting to hold a portion of the transmit power corresponding to a carrier in the plurality of carriers by maintaining the portion of the transmit power corresponding to the carrier, wherein the portion of the transmit power comprises a closed loop transmit power for the carrier based on a received reverse link power control (RPC) command and an open loop transmit power for the carrier based on an automatic gain control (AGC) filtered value.

18. The method of claim 17, wherein the selected power is one of a uplink pilot power for the carrier, a total transmit power for the carrier, the open loop transmit power for the carrier, the closed loop transmit power for the carrier, a sum of uplink pilot powers for the plurality of carriers, a sum of open loop transmit powers for the plurality of carriers, a sum of closed loop transmit powers for the plurality of carriers, or a sum of total transmit powers for the plurality of carriers.

19. The method of claim 18, wherein the portion of the transmit power comprises an uplink pilot power.

20. The method of claim 19, wherein the uplink pilot power for the carrier is a component of the total transmit power for the carrier.

21. A method of controlling an uplink transmit power operable at an access terminal, comprising:
communicating with an access network over a plurality of carriers;
receiving an instruction to increase a transmit power; and
if a selected power is greater than or equal to an upper threshold, ratcheting to hold a portion of the transmit power corresponding to a carrier in the plurality of carriers by maintaining the portion of the transmit power corresponding to the carrier, wherein the portion of the transmit power comprises a closed loop transmit power for the carrier based on a received reverse link power control (RPC) command and an open loop transmit power for the carrier based on an automatic gain control (AGC) filtered value.

22. The method of claim 21, wherein the selected power is one of a uplink pilot power for the carrier, a total transmit power for the carrier, the open loop transmit power for the carrier, the closed loop transmit power for the carrier, a sum of uplink pilot powers for the plurality of carriers, a sum of open loop transmit powers for the plurality of carriers, a sum of closed loop transmit powers for the plurality of carriers, or a sum of total transmit powers for the plurality of carriers.

23. The method of claim 21, wherein the portion of the transmit power comprises an uplink pilot power.

24. The method of claim 22, wherein a total uplink power is a sum of a carrier total uplink power for each of the plurality of carriers.

25. A non-transitory computer readable storage medium containing a program which, when executed by a processing circuit, performs an operation, the operation comprising a method of controlling an uplink transmit power operable at an access terminal, the method comprising:
  communicating with an access network over a plurality of carriers;
  receiving an instruction to reduce a transmit power; and
  if a selected power is less than or equal to a lower threshold, ratcheting to hold a portion of the transmit power corresponding to a carrier in the plurality of carriers by maintaining the portion of the transmit power corresponding to the carrier, wherein the portion of the transmit power comprises a closed loop transmit power for the carrier based on a received reverse link power control (RPC) command and an open loop transmit power for the carrier based on an automatic gain control (AGC) filtered value.

26. The non-transitory computer readable storage medium of claim 25, wherein the selected power is one of a uplink pilot power for the carrier, a total transmit power for the carrier, the open loop transmit power for the carrier, the closed loop transmit power for the carrier, a sum of uplink pilot powers for the plurality of carriers, a sum of open loop transmit powers for the plurality of carriers, a sum of closed loop transmit powers for the plurality of carriers, or a sum of total transmit powers for the plurality of carriers.

27. The non-transitory computer readable storage medium of claim 26, wherein the portion of the transmit power comprises an uplink pilot power.

28. The non-transitory computer readable storage medium of claim 27, wherein the uplink pilot power for the carrier is a component of the total transmit power for the carrier.

29. A non-transitory computer readable storage medium containing a program which, when executed by a processing circuit, performs an operation, the operation comprising a method of controlling an uplink transmit power operable at an access terminal, the method comprising:
  communicating with an access network over a plurality of carriers;
  receiving an instruction to increase a transmit power; and
  if a selected power is greater than or equal to an upper threshold, ratcheting to hold a portion of the transmit power corresponding to a carrier in the plurality of carriers by maintaining the portion of the transmit power corresponding to the carrier, wherein the portion of the transmit power comprises a closed loop transmit power for the carrier based on a received reverse link power control (RPC) command and an open loop transmit power for the carrier based on an automatic gain control (AGC) filtered value.

30. The non-transitory computer readable storage medium of claim 29, wherein the selected power is one of a uplink pilot power for the carrier, a total transmit power for the carrier, the open loop transmit power for the carrier, the closed loop transmit power for the carrier, a sum of uplink pilot powers for the plurality of carriers, a sum of open loop transmit powers for the plurality of carriers, a sum of closed loop transmit powers for the plurality of carriers, or a sum of total transmit powers for the plurality of carriers.

31. The non-transitory computer readable storage medium of claim 29, wherein the portion of the transmit power comprises an uplink pilot power.

32. The non-transitory computer readable storage medium of claim 30, wherein a total uplink power is a sum of a carrier total uplink power for each of the plurality of carriers.

* * * * *